United States Patent
Park

(10) Patent No.: US 6,955,774 B2
(45) Date of Patent: Oct. 18, 2005

(54) PLASTIC OPTICAL FIBER AND METHOD FOR PRODUCING THE SAME

(75) Inventor: Se Ho Park, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/087,016

(22) Filed: Mar. 22, 2005

(65) Prior Publication Data

US 2005/0163452 A1 Jul. 28, 2005

Related U.S. Application Data

(62) Division of application No. 10/639,354, filed on Aug. 12, 2003.

(30) Foreign Application Priority Data

Aug. 26, 2002 (KR) ...................... 10-2002-0050470

(51) Int. Cl.[7] ........................... B29D 11/00; G02B 6/00
(52) U.S. Cl. ..................................... 264/1.24; 385/142
(58) Field of Search .............................. 385/141, 142, 385/144; 264/1.24

(56) References Cited

U.S. PATENT DOCUMENTS

| | | | |
|---|---|---|---|
| 3,233,189 A | 2/1966 | Guggenheim et al. | 331/94.5 |
| 4,015,217 A | 3/1977 | Snitzer | 331/94.5 |
| 4,161,500 A | 7/1979 | Schleinitz et al. | 264/1 |
| 5,774,620 A * | 6/1998 | Nishida et al. | 385/141 |
| 5,861,129 A | 1/1999 | Katoot | 422/135 |
| 6,292,292 B1 | 9/2001 | Garito et al. | 359/341 |
| 6,519,975 B1 * | 2/2003 | Bange et al. | 65/384 |
| 2002/0041042 A1 | 4/2002 | Walker et al. | 264/1.24 |
| 2003/0024276 A1 * | 2/2003 | Anderson et al. | 65/390 |

FOREIGN PATENT DOCUMENTS

| | | | | |
|---|---|---|---|---|
| EP | 0472384 A2 | 8/1991 | ........... | B29B 11/00 |
| JP | 60119509 | 6/1985 | ........... | G02B 6/00 |
| WO | WO00-56837 | 9/2000 | ........... | C09K 11/59 |

* cited by examiner

*Primary Examiner*—John D. Lee
*Assistant Examiner*—James D. Stein
(74) *Attorney, Agent, or Firm*—Cha & Reiter, L.L.C.

(57) ABSTRACT

A plastic optical fiber and a method for producing the same is disclosed. The plastic optical fiber is formed as a fiber of core-cladding structure. A protective layer or shield layer may be provided on the outer surface of the optical fiber of core-cladding structure for improving thermal resistance of the optical fiber and protecting the optical fiber from air and moisture. The plastic optical fiber uses fluorinated plastic, which contains a rare earth component as a core material, and a cladding material, which does not comprise a rare earth component but essentially consists of a polymer chain, which essentially consists of bonded —$[CF_2]_n$— monomers and has a refractive index lower than that of the core material. The optical fiber is produced by a melting-drawing technique.

7 Claims, 4 Drawing Sheets

PLASTIC OPTICAL FIBER AND METHOD FOR PRODUCING THE SAME

This application is a Divisional Application of U.S. Ser. No. 10/639,354, filed Aug. 12, 2003.

CALIM OF PRIORITY

This application claims priority to an application entitled "Plastic Optical Fiber and Method for Producing the Same," filed in the Korean Intellectual Property Office on Aug. 26, 2002 and assigned Serial No. 2002-50470, the contents of which are hereby incorporated by reference.

BACKGROUND OF THE INVENTION

1. Field of the Invention

The present invention relates to a plastic optical fiber, and more particularly to a fluorinated plastic optical fiber that contains a rare earth component and a method for producing the plastic optical fiber.

2. Description of the Related Art

Generally, rare earth elements such as La, Ce, Pr, Nd, Pm, Sm, Eu, Tb, Dy, Ho, Er, Tm and Yb can emit fluorescence by 4f—4f electronic transition in a 3+ ionic state. Optical fibers containing such rare earth elements can amplifying an input light signal due to a stimulated emission effect. Also, such optical fibers may function as an optical fiber laser that continuously generates the stimulated emission if the reflectivity of both ends of the optical fibers is properly tuned. At a wavelength in the range of 1.3 to 1.4 μm, which is a typical bandwidth for optical communication, $Pr^{3+}$, $Nd^{3+}$, $Dy^{3+}$ and $Tm^{3+}$ emit fluorescence. $Tm^{3+}$ emits fluorescence at a wavelength in the range of 1.4 to 1.5 μm, and $Er^{3+}$ emits fluorescence at a wavelength in the range of 1.5 to 1.6 μm.

However, such optical fiber amplifiers have generally not been put to practical use because $Pr^{3+}$, $Nd^{3+}$ and $Dy^{3+}$ have a poor efficiency in emitting fluorescence in quartz glass at a wavelength in the range of 1.3 to 1.4 μm or 1.4 to 1.5 μm. Due to this, conventional optic fiber amplifiers have been manufactured by adding a rare earth element to a fluoride-based glass optical fiber, thereby improving the fluorescence emitting efficiency. For example, details regarding such procedures are disclosed in U.S. Pat. Nos. 5,071,460 and 5,567,219.

However, fluoride-based glass optical fibers have poor chemical durability and mechanical strength because their chemical bonds are easily broken down by moisture. In addition, they have a disadvantage in that the light transmittance and light amplification efficiencies of the fluoride-based glass optical fibers rapidly decreases with time. Particularly, such optical fibers are rapidly corroded at junctions between the optical fibers because those junctions are exposed directly to air and moisture when an outer protective coating is removed from the junctions.

It is also noted that conventional plastic optical fibers have been developed for use in Gigabit Ethernet that substitute for copper wire communication in local area communication networks. Generally, plastic optical fibers are chemically stable and exhibit superior usability at normal temperature ranges. However, the conventional plastic optical fibers have a disadvantage in that their application for an infrared region is restricted because a hydrocarbon (C—H) high polymer chain structure absorbs light having an infrared wavelength.

Accordingly, there is a need in the art for improved plastic optical fibers.

SUMMARY OF THE INVENTION

Accordingly, the present invention has been made to solve the above-mentioned problems occurring in the prior art glass optical fibers. The object of the present invention is to provide a plastic optical fiber with improved chemical durability, mechanical strength and thermal resistance, and a process for producing the same.

In order to accomplish this object, there is provided an optical fiber of core-cladding structure, wherein the core material essentially consists of fluorinated plastic, which contains a rare earth component, and the cladding material does not contain a rare earth component but essentially consists of fluorinated plastic having a refractive index lower than that of the core material.

In contrast to the conventional plastic optical fiber discussed above, fluorinated plastic having a carbon-fluoride (C—F) bond transmits infrared light well and thus allows for infrared communication when used as an optical fiber. Moreover, fluorinated plastic is widely applicable because it has remarkably superior chemical durability and can be used under broad range of temperature as compared to existing hydrocarbon-based plastics. In particular, amorphous fluorinated plastic is a promising material as an optical fiber for communication, due to its low Rayleigh scattering loss. Teflon™ and Cytop™ are examples of fluorinated plastic.

The optical fiber may further include a protective layer formed from a polymer on the outer surface of the core-cladding structure.

According to another aspect of the present invention, a process for producing a plastic optical fiber is provided; the process includes the steps of:

filling a fluorinated solvent with fluorinated plastic powder dispersed therein and a rare earth component into a reactor;

forming a core preform by evaporating the solvent through the vacuum-evacuation of the interior of the reactor while heating and rotating the reactor and, then by curing the fluorinated plastic;

assembling the core preform at the center of a cladding preform which does not contain a rare earth component but essentially consists of fluorinated plastic having a refractive index lower than that of the core material;

heating and softening the fluorinated plastic preform prepared by the preceding step; and drawing an optic fiber from the softened preform.

According to another aspect of the present invention, a method for producing a plastic optical fiber is provided. The method includes the steps of:

mixing fluorinated plastic powder and rare earth component powder and filling the mixed powder into a pressure container;

forming a core preform by heating and extruding the mixed powder;

assembling the core preform at the center of a cladding preform which does not contain a rare earth component but essentially consists of fluorinated plastic having a refractive index lower than that of the core material;

heating and softening the fluorinated plastic preform prepared by the preceding step; and drawing an optical fiber from the preform.

BRIEF DESCRIPTION OF THE DRAWINGS

The above and other objects, features and advantages of the present invention will be more apparent from the fol

DETAILED DESCRIPTION OF THE PREFERRED EMBODIMENTS

Preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
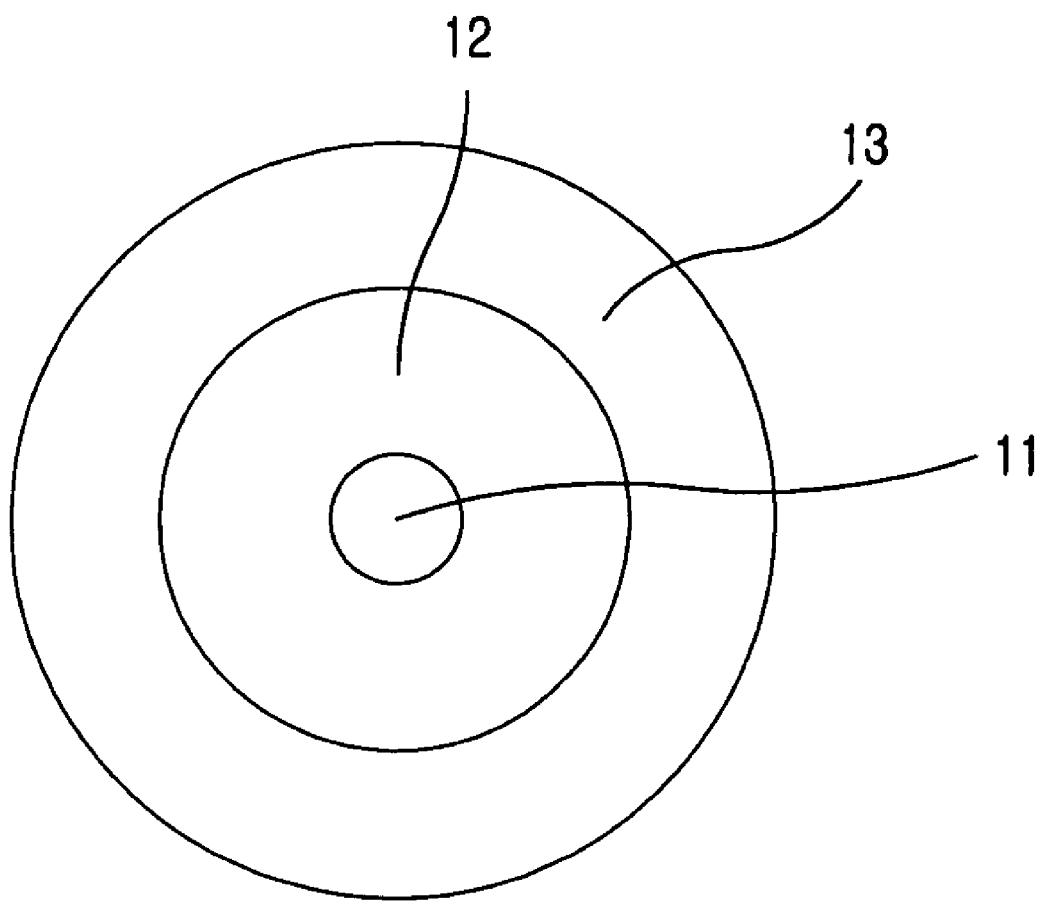
- FIG. 1 shows a cross-section of a plastic optical fiber in accordance with an embodiment of the present invention.

FIG. 1 shows a structure of a plastic optical fiber 10 in accordance with one embodiment of the present invention.

The plastic optical fiber 10 is basically formed as a core 11 and a cladding 12 structure. It is also possible to provide a protective layer or shield layer 13 on the outer surface thereof for protecting the plastic optical fiber 10 of the core-cladding structure from air or moisture.

The optical fiber 10 uses fluorinated plastic which contains a rare earth component, as a core material, and uses a polymer chain which essentially consists of connected $—[CF_2]_n—$ monomers without containing a rare earth component and has a lower refractive index than the core material, as a cladding material. The optical fiber 10 is produced by a melting and drawing technique.

I. Fluorinated Plastic Core 11 which Contains a Rare Earth Component

The "rare earth component" comprises any of the following combinations A) to E):

A) $(Y_{1-n}La_n)_{1-m}Ln_mX_3$ (m=0.0001~1.0, n=1~1.0);
B) $(La_{1-m}Ln_m)_2S_3$ (m=0.0001~1.0);
C) $(ZrF_3—BaF_2—LaF_3—AlF_3—NaF)_{1-m}(LnF_3)_m$ (m=0.0001~0.1);
D) $(InF_3—GaF_3—PbF_2—CdF_3)_{1-m}(LnF_3)_m$ (m=0.0001~0.1); and
E) $(RX—GeS_2—As_2S_3—Ga_2S_3)_{1-m}(LnX_3)_m$ (m=0.0001~0.1), wherein Ln is a lanthanide metallic component which includes at least one of Ce, Pr, Sm, Eu, Gd, Th, Dy, Ho, Er, Tm and Yb;

R is an alkali metal component which includes at least one of Li, Na, K, Rb and Cs; and X is a halide component which includes at least one of F, Cl, Br, and I; and Sn is a component which includes sulfur.

In addition, the rare earth component may be limited to a fluorinated glass or sulfide glass composition to which at least one of the lanthanide elements are added in a concentration of 0.01~10%.

In the above, the fluorinated plastic is formed from a polymer chain which essentially consists of bonded $—[CF_2]_n—$ monomers. For example, such a fluorinated plastic may be Teflon™ (AF, FEP, PFA, PFTF), Cytop™ and the like.

II. Fluorinated Plastic Cladding 12 which Encloses the Fluorinated Plastic Core 11

The cladding 12 is formed from a polymer chain which essentially consists of bonded $—[CF_2]_n—$ monomers without containing a rare earth component and has a refractive index lower than that of the core by 0.01~10%.

III. Polymer coating (e.g., Layer 13) which Encloses the Fluorinated Plastic Optical Fiber The polymer coating may be selectively applied when it is required for coloring the fluorinated optical fiber or maintaining the diameter of the optical fiber.

Now, the method for producing the plastic optical fiber 10 in accordance with one embodiment of the present invention will be described.

Figure 2:
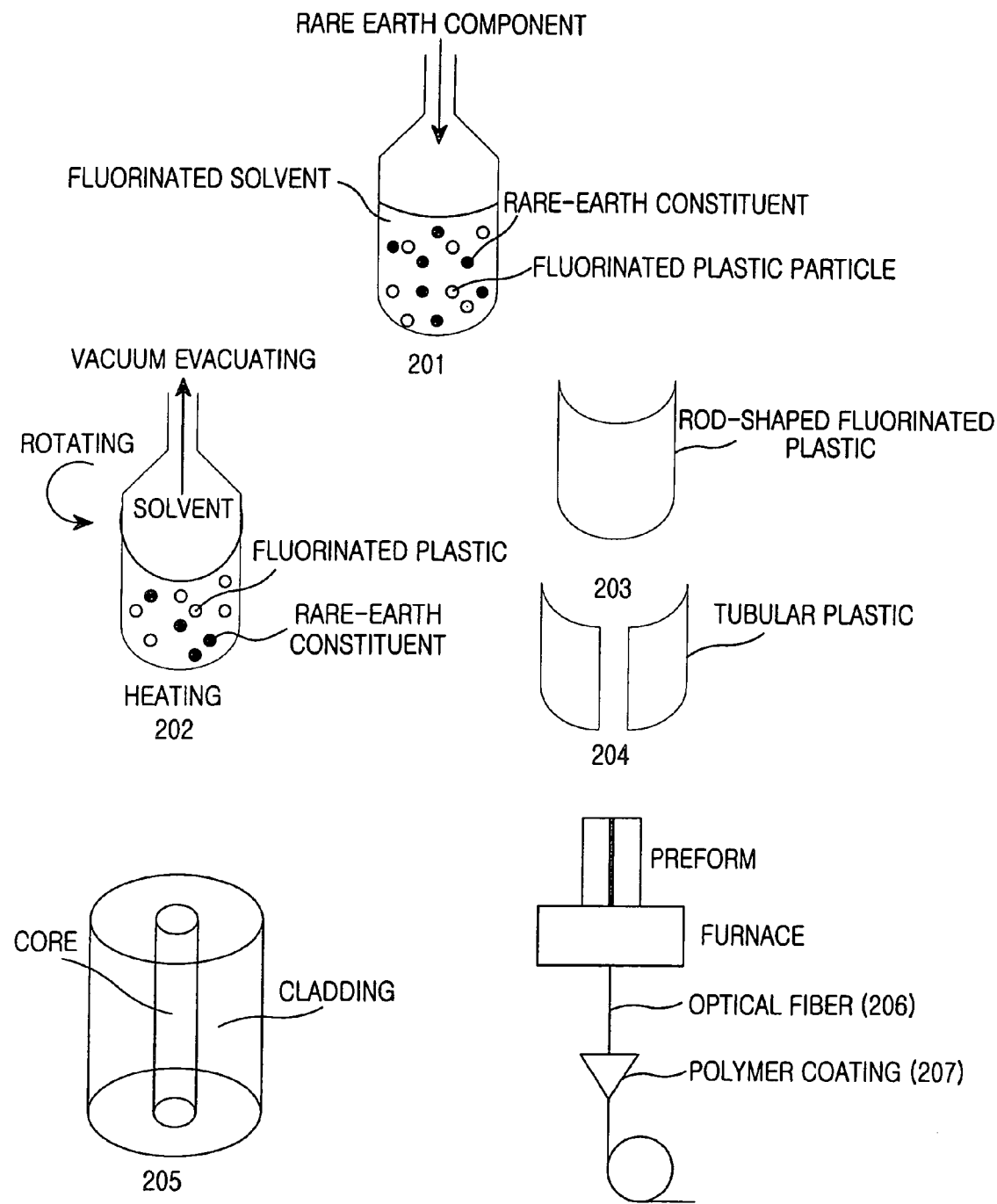
FIG. 2 illustrates a process for producing a plastic optical fiber in accordance with an embodiment of the present invention.

FIG. 2 illustrates a process for producing a plastic optical fiber in accordance an embodiment of the present invention.

First, rare earth component powder having a particle diameter distributed in the range of 0.1 to 101 μm is evenly dispersed into a fluorinated solvent(Fluorinert™), in a volumetric ratio of 0.01 to 0.10, in which solvent fluorinated plastic powder having a particle diameter of 0.1 to 10 μm has been dispersed, in a volumetric ratio of 0.01 to 0.3 (step 201).

A solution prepared through the above procedure is filled into a test tube, and the test tube is rotated (10~2000 rpm) and heated to a temperature in the range of 100 to 300° C. The tube is then vacuum-evacuated so that the solvent is evaporated, and the fluorinated plastic is cured. (Step 202).

When the curing begins, the rotating speed of the tube is reduced and the temperature of the test tube is lowered. For example, the rotating speed may be less than 60 rpm/min, and temperature may be less than rate <10° C./min. At this time, a rod-shaped fluorinated plastic preform is produced (step 203). When the curing begins, it is also possible to lower the temperature of the test tube to produce a tubular fluorinated plastic core preform while maintaining the rotational speed of the test tube (step 204). Here, the rotating speed and temperature condition may be same as in step 203.

A rod-shaped or tubular core preform is assembled at the center of a fluorinated plastic cladding preform which has been prepared by a extruding method or the like and does not contains a rare earth component (step 205).

The fluorinated plastic preform prepared through the afore-mentioned procedure is softened by being heated (e.g., in a furnace) to a temperature in the range of 150 to 500° C. The preform softened in this manner is produced into an optical fiber by a method of elongating the preform, i.e., a extruding method (step 206). In addition, if a vacuum is applied to the center of the preform while the preform is being heated, empty voids present between the core and the cladding are contracted and removed. Especially, if a tubular core is used, empty voids at the center of the core are contracted and removed by the vacuum.

Optionally, a final step for putting a polymer coating film over the optical fiber after the optical fiber is drawn (step 207) may be included.

Figure 3:
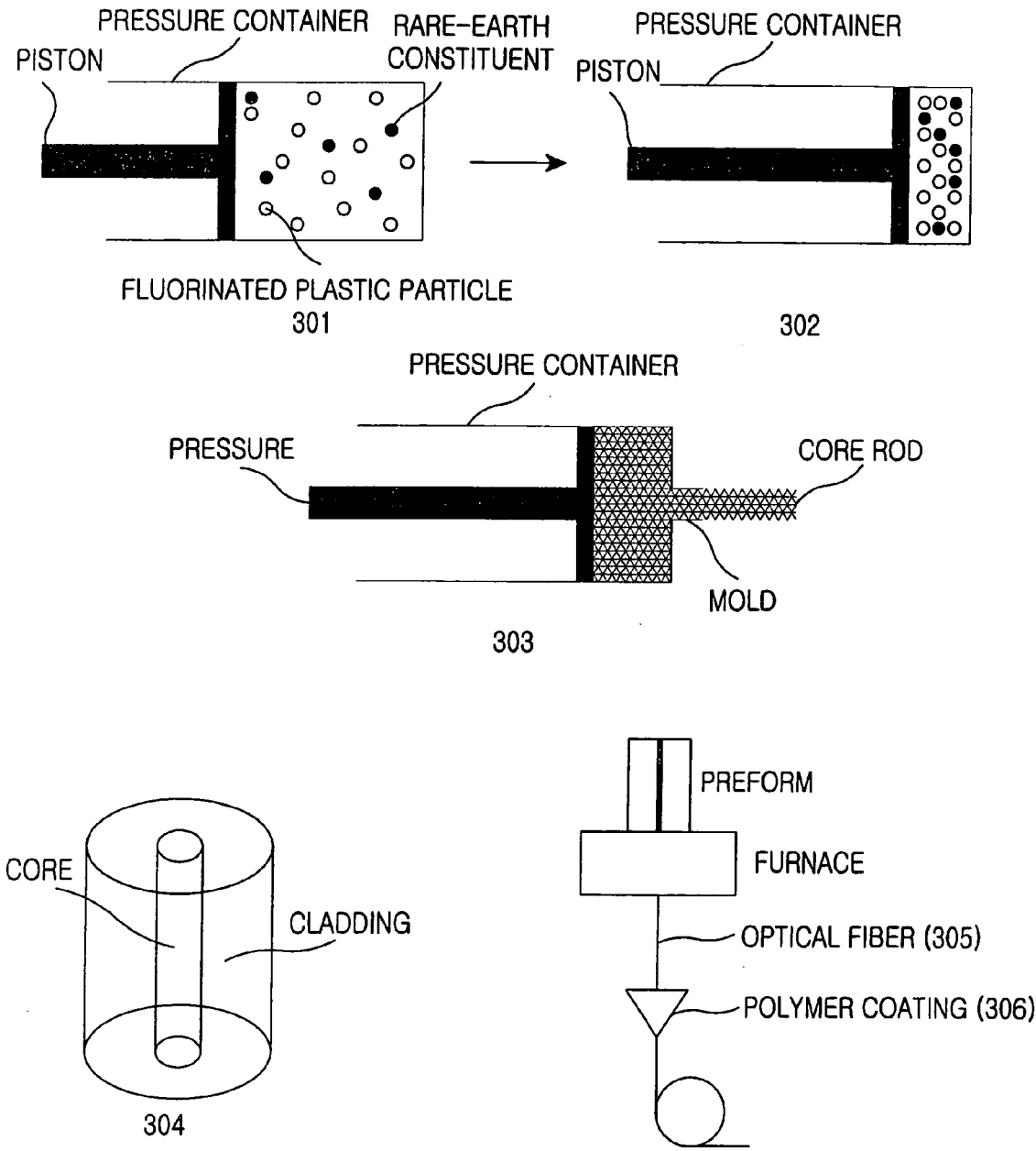
FIG. 3 illustrates a process for producing a plastic optical fiber in accordance with another embodiment of the present invention.

FIG. 3 illustrates a process for producing a plastic optical fiber in accordance with another embodiment of the present invention.

First, a fluorinated plastic powder having a particle diameter distributed in the range of 0.1 to 10 μm, in a volumetric ratio of 0.50 to 0.99, and a rare earth component powder having a particle diameter of 0.1 to 10 μm, in a volumetric ratio of 0.01 to 0.50, are evenly mixed (step 301).

A rod-shaped core preform is produced by filling the mixed powder into a pressure container, heating the powder to a temperature in the range of 150 to 500° C., and applying a pressure in the range of $10^3$ to $10^7$ Pa (step 302). At this time, if the mixed powder is drawn at a temperature in the range of 150 to 500° C., it is possible to produce a rod-shaped core preform (step 303).

A rod-shaped or tubular core preform is assembled at the center of a fluorinated plastic cladding preform which has been prepared by a extruding method and the like and does not contains a rare earth component (step 304).

The fluorinated plastic preform prepared through the afore-mentioned procedure is softened by being heated (e.g., in a furnace) to a temperature in the range of 150 to 500° C. The preform softened in this manner is formed into an optical fiber by a method of elongating the preform, i.e., a extruding method (step 305). In addition, if a vacuum is applied to the center of the preform while the preform is being heated, empty voids present between the core and the cladding are contracted and removed. Especially, if a tubular core is used, empty voids at the center of the core are contracted and removed by the vacuum.

Optionally, a step for putting a polymer coating film over the optical fiber after the optical fiber is drawn may be included (step 306).

EXAMPLE

1. Composition

The applicants have produced a Teflon™ FEP core preform which contains 10 volume % of a rare earth component having a compositional formula, $(GeS_2$—$As_2S_3$—$CsBr$—$Ga_2S_3)_{0.998}(TmBr_3)_{0.002}$, using the following method.

2. Method of Production

A powder of a rare earth component having a compositional formula, $(GeS_2$—$As_2S_3$—$CsBr$—$Ga_2S_3)_{0.998}(TmBr_3)_{0.002}$, and a particle diameter in the range of 0.1 to 10 μm is add and mixed with Teflon™ FEP powder having a particle diameter in the range of 0.1 to 10 μm in the ratio of 1:9.

A rod-shaped core preform is produced by filling the mixed powder into a pressure container, and applying a pressure of $10^6$ Pa at a temperature of 340° C.

Figure 4:
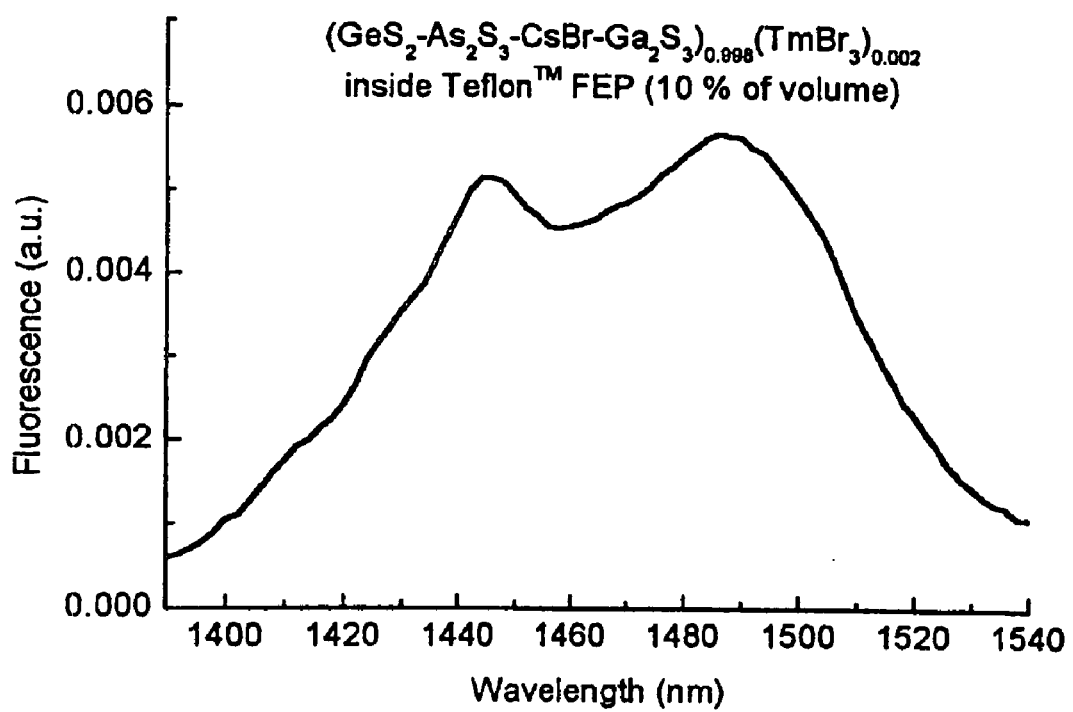
FIG. 4 shows a fluorescence emission spectrum of an optical fiber produced in accordance with an embodiment of the present invention.

FIG. 4 shows a fluorescence emission spectrum of the optical fiber produced in accordance with the above example. The spectrum was obtained by measuring fluorescence within the range of infrared wavelengths using a spectroscope. The fluorescence was produced from a sample after a laser beam having a wavelength of 800 nm was entered into the center of the sample. As shown in FIG. 4, a fluorescence emission which can amplify an optical signal of S-band (wavelength bandwidth of 1450 to 1520 nm) was observed.

As described above, the plastic optical fiber can overcome the problems of the prior art and has advantages in that it has excellent improved chemical durability, mechanical strength and thermal resistance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A process for producing a plastic optical fiber comprising the steps of:
    filling a fluorinated solvent with fluorinated plastic powder dispersed therein and a rare earth component into a reactor;
    forming a core preform by evaporating the fluorinated solvent through a vacuum-evacuation of an interior of the reactor while heating and rotating the reactor, and then by curing a resulting fluorinated plastic;
    assembling the core preform at the center of a cladding preform which does not contain a rare earth component but essentially consists of fluorinated plastic having a refractive index lower than that of a core material to produce a fluorinated plastic preform;
    heating and softening the fluorinated plastic preform; and
    drawing an optic fiber from the softened fluorinated plastic preform.

2. The process according to claim 1, wherein a dispersed content of the fluorinated plastic powder is 0.01 to 0.30 in volumetric ratio, and a dispersed content of the rare earth powder is 0.01 to 0.10 in volumetric ratio.

3. The process according to claim 1, wherein the step of forming the core preform by curing the resulting fluorinated plastic comprises the steps of:
    evaporating a solvent by vacuum exhaustion of a interior of the reactor while heating the reactor to a temperature of 100 to 300° C.; and
    forming a rod-shaped fluorinated plastic core preform by lowering a temperature while reducing a rotation speed of the reactor when the curing of the resulting fluorinated plastic begins.

4. The process according to claim 1, wherein the step of forming the core preform by curing the resulting fluorinated plastic comprises the steps of:
    evaporating a solvent by vacuum exhaustion of a interior of the reactor while heating the reactor to a temperature of 100 to 300° C.; and
    forming a tubular fluorinated plastic core preform by lowering a temperature while maintaining a rotation speed of the reactor when the curing of the resulting fluorinated plastic begins.

5. The process according to claim 3 or 4, wherein the step of heating and softening the fluorinated plastic preform is performed at a temperature of 150 to 500° C.

6. The process according to claim 1, further comprising the step of coating a polymer layer when drawing the optic fiber from the softened fluorinated plastic preform.

7. A method for producing a plastic optical fiber comprising the steps of:
    mixing a fluorinated plastic powder and a rare earth component powder and filling the mixed powder into a pressure container;
    forming a core preform by heating and extruding the mixed powder;
    assembling the core preform at a center of a cladding preform which does not contain a rare earth component but essentially consists of fluorinated plastic having a refractive index lower than that of a core material to produce a fluorinated plastic preform;
    heating and softening the fluorinated plastic preform; and
    drawing an optical fiber from the fluorinated plastic preform.

* * * * *